(12) United States Patent
Wang et al.

(10) Patent No.: US 11,637,523 B2
(45) Date of Patent: Apr. 25, 2023

(54) POWER TOOL AND CONTROL METHOD OF THE SAME

(71) Applicant: Nanjing Chervon Industry Co., Ltd., Nanjing (CN)

(72) Inventors: Hongwei Wang, Nanjing (CN); Dezhong Yang, Nanjing (CN); Yongan Sun, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 8 days.

(21) Appl. No.: 17/354,784

(22) Filed: Jun. 22, 2021

(65) Prior Publication Data
US 2021/0320613 A1 Oct. 14, 2021

Related U.S. Application Data

(63) Continuation of application No. 17/080,978, filed on Oct. 27, 2020, now Pat. No. 11,070,164, which is a
(Continued)

(30) Foreign Application Priority Data

May 3, 2018 (CN) .......................... 201810413922.3

(51) Int. Cl.
*H02P 29/68* (2016.01)
*B23B 45/02* (2006.01)
(Continued)

(52) U.S. Cl.
CPC .............. *H02P 29/68* (2016.02); *B23B 45/02* (2013.01); *B23D 45/16* (2013.01); *B24B 23/028* (2013.01); *B25B 19/00* (2013.01); *H02P 7/29* (2013.01)

(58) Field of Classification Search
CPC . H02P 29/68; H02P 7/29; H02P 6/085; B23B 45/02; B23D 45/16; B24B 23/028; B25B 19/00
(Continued)

(56) References Cited

U.S. PATENT DOCUMENTS 5,548,199 A * 8/1996 Bidaud ...................... H02P 1/30
318/807
7,250,737 B2 7/2007 Takahashi
(Continued)

FOREIGN PATENT DOCUMENTS

CN 1449082 A 10/2003
CN 101689829 A 3/2010
(Continued)

OTHER PUBLICATIONS

ISA/CN, Int. Search Report issued on PCT application No. PCT/CN2019/083863, dated Jul. 26, 2019, 3 pages.

*Primary Examiner* — David Luo
(74) *Attorney, Agent, or Firm* — Greenberg Traurig, LLP

(57) ABSTRACT

A power tool has a functional component, a motor, a power supply module, a controller and a drive circuit including a first drive terminal and a second drive terminal respectively electrically connected to a first power terminal and a second power terminal of the power supply module, multiple high-side switches wherein high-side terminals of the high-side switches are respectively electrically connected to the first drive terminal, and multiple low-side switches wherein low-side terminals of the low-side switches are respectively electrically connected to the second drive terminal. The controller is configured to output a first control signal to one high-side switch to place it in an on or off state and output a second control signal to one low-side switch to place it in the other state. The low-side terminal of one high-side
(Continued)

switch is connected to the high-side terminal of one low-side switch.

20 Claims, 11 Drawing Sheets

Related U.S. Application Data continuation of application No. PCT/CN2019/083863, filed on Apr. 23, 2019.

(51) Int. Cl.
  *B23D 45/16* (2006.01)
  *B24B 23/02* (2006.01)
  *B25B 19/00* (2006.01)
  *H02P 7/29* (2016.01)

(58) Field of Classification Search
  USPC .................. 318/3, 599, 560; 361/679.01
  See application file for complete search history.

(56) References Cited

U.S. PATENT DOCUMENTS

| | | | |
|---|---|---|---|
| 7,535,684 B2 * | 5/2009 | Ganev | H02P 29/02 |
| | | | 318/462 |
| 9,337,763 B2 | 5/2016 | Funabashi et al. | |
| 10,680,494 B2 * | 6/2020 | Lewis | H02K 7/145 |
| 2016/0322834 A1 | 11/2016 | Carpenter, Jr. et al. | |
| 2017/0373614 A1 | 12/2017 | Lewis et al. | |

FOREIGN PATENT DOCUMENTS

| | | |
|---|---|---|
| CN | 101758488 A | 6/2010 |
| CN | 104467546 A | 3/2015 |
| CN | 105291060 A | 2/2016 |
| CN | 205646881 U | 10/2016 |
| EP | 3296063 A1 | 3/2018 |

* cited by examiner

POWER TOOL AND CONTROL METHOD OF THE SAME

RELATED APPLICATION INFORMATION

The present application is a continuation of U.S. application Ser. No. 17/080,978, filed on Oct. 27, 2020, which application is a continuation of International Application Number PCT/CN2019/083863, filed on Apr. 23, 2019, the disclosure of which is incorporated herein by reference in its entirety. Further, this application claims the priority of Chinese Patent Application No. 201810413922.3, filed on May 3, 2018 in the SIPO (State Intellectual Property Office—Chinese Patent Office), the disclosure of which is incorporated herein in their entirety by reference.

FIELD

The present disclosure relates to a power tool and a control method thereof, in particular to a power tool and a control method thereof that can suppress the temperature rise and power loss of switches.

BACKGROUND

Power tools generally use motors to drive a functional component to move, so as to realize the functions of power tools. The motor may be a brushless motor or a brushed motor. For brushless motors, the drive circuit is generally controlled by an inverter drive bridge circuit. The power components of the inverter drive bridge circuit, that is, the switches (MOSFETs, IGBTs, etc.) generally generate a lot of heat. Switches have parasitic diodes; when a switch is toggled from the on state to the off state, the current in the motor windings will pass through the parasitic diode of another switch because current is not transient. The parasitic diode heats up due to the internal resistance, rising the temperature of the switch of the parasitic diode and the drive circuit. Especially, under heavy load and high current, the heat loss is more significant.

SUMMARY

In order to cure the deficiencies of the prior art, the purpose of the present disclosure is to provide a power tool and a control method thereof that can suppress the temperature rise and power loss of switches.

In order to achieve the above objectives, the present disclosure adopts the following technical solutions:

An example power tool includes: a functional component for realizing a function of the power tool; a motor for driving the functional component, the motor having a plurality of windings; a power supply module configured to provide power supply current, the power supply module including a first power terminal and a second power terminal; a drive circuit electrically connected to the motor, the drive circuit including: a first drive terminal electrically connected with the first power terminal; a second drive terminal electrically connected with the second power terminal; a plurality of high-side switches, high-side terminals of the plurality of high-side switches being respectively electrically connected to the first drive terminal; a plurality of low-side switches, low-side terminals of the plurality of low-side switches being respectively electrically connected to the second drive terminal; and a controller configured to: output a first control signal to one of the plurality of high-side switches to make one of the plurality of high-side switches in an on state or an off state; and output a second control signal to one of the plurality of low-side switches to make one of the plurality of low-side switches in the other of the on state and the off state; wherein the low-side terminal of one of the plurality of high-side switches is connected to the high-side terminal of one of the plurality of low-side switches.

Optionally, the first control signal output by the controller is a first PWM signal and the second control signal output by the controller is a second PWM signal.

Optionally, a duty cycle of the first PWM signal ranges from 20% to 90%.

Optionally, a duty cycle of the first PWM signal ranges from 10% to 95%.

Optionally, a duty cycle of the first PWM signal ranges from 30% to 95%.

Optionally, an interval between a falling edge of the first control signal and a rising edge of the second control signal is a first preset duration.

Optionally, a value range of the first preset duration is 5 microseconds to 10 microseconds.

Optionally, an interval between a rising edge of the first control signal and a falling edge of the second control signal is a second preset duration.

Optionally, a value range of the second preset duration is 5 microseconds to 30 microseconds.

Optionally, an interval between a falling edge of the first control signal and a rising edge of the second control signal is a first preset duration, and an interval between a rising edge of the first control signal and a falling edge of the second control signal is a second preset duration.

Optionally, a ratio of the first preset duration to the second preset duration is less than or equal to 1.

Optionally, the controller outputs the first control signal and the second control signal synchronously.

Optionally, a sum of a duty cycle of the first PWM signal and a duty cycle of the second PWM signal is less than 100%.

Optionally, a duty cycle of the second PWM signal ranges from 20% to 90%.

Optionally, a duty cycle of the second PWM signal ranges from 10% to 95%.

Optionally, a duty cycle of the second PWM signal ranges from 30% to 95%.

Optionally, the power tool further includes: a current measuring module configured to detect or estimate phase current; the controller is configured to: when the phase current is less than or equal to zero, output the second control signal to turn off one of the plurality of low-side switches, or output the first control signal to control to turn off one of the plurality of high-side switches.

Said controller may include a temperature sensor arranged inside the controller, and the controller estimates a temperature of the drive circuit according to a detection value of the temperature sensor, and when the detection value of the temperature of the drive circuit exceeds a predetermined threshold, the controller controls the drive circuit to stop working.

Another example power tool includes: a functional component for realizing a function of the power tool; a motor for driving the functional component, the motor having a plurality of windings; a power supply module configured to provide power supply current, the power supply module including a first power terminal and a second power terminal; a drive circuit electrically connected to the motor, the drive circuit including: a first drive terminal electrically connected with the first power terminal; a second drive terminal electrically connected with the second power terminal; a first high-side switch, a high-side terminal of the first high-side switch being electrically connected to the first drive terminal; a first low-side switch, a low-side terminal of the first low-side switch being electrically connected to the second drive terminal; and a controller configured to: output a first control signal to the first high-side switch to make the first high-side switch in an on state or an off state; and output a second control signal to the first low-side switch to make the first low-side switch is in the other of the on state and the off state; wherein the low-side terminal of the first high-side switch is connected to the high-side terminal of the first low-side switch.

Optionally, the drive circuit further includes a second low-side switch, and a low-side terminal of the second low-side switch is electrically connected to the second drive terminal; the controller is configured to: output the first control signal to the first high-side switch and the second low-side switch to form a first current circuitry; in the first current circuitry, the power supply current provided by the power supply module passes through the first drive terminal, the first high-side switch, the plurality of windings, the second low-side switch and the second drive terminal.

Optionally, the first control signal output by the controller is a first PWM signal; the second control signal output by the controller is a second PWM signal.

Optionally, a duty cycle of the first PWM signal ranges from 20% to 90%.

Optionally, a duty cycle of the first PWM signal ranges from 10% to 95%.

Optionally, a duty cycle of the first PWM signal ranges from 30% to 95%.

Optionally, an interval between a falling edge of the first control signal and a rising edge of the second control signal is a first preset duration.

Optionally, a value range of the first preset duration is 5 microseconds to 10 microseconds.

Optionally, an interval between a rising edge of the first control signal and a falling edge of the second control signal is a second preset duration.

Optionally, an interval between a falling edge of the first control signal and a rising edge of the second control signal is a first preset duration, and an interval between a rising edge of the first control signal and a falling edge of the second control signal is a second preset duration.

Optionally, a ratio of the first preset duration to the second preset duration is less than or equal to 1.

Optionally, the controller outputs the first control signal and the second control signal synchronously.

Optionally, a sum of a duty cycle of the first PWM signal and a duty cycle of the second PWM signal is less than 100%.

Optionally, a duty cycle of the second PWM signal ranges from 20% to 90%.

Optionally, a duty cycle of the second PWM signal ranges from 10% to 95%.

Optionally, a duty cycle of the second PWM signal ranges from 30% to 95%.

Optionally, the power tool further includes: a current measuring module configured to detect or estimate phase current; the controller is configured to: when the phase current is less than or equal to zero, output the second control signal to turn off one of the first low-side switch and the second low-side switch, or output the first control signal to turn off the first high-side switch.

An example control method of a power tool is also described. In this example, the power tool has a drive circuit that includes: a first drive terminal electrically connected to the first power terminal; a second drive terminal electrically connected to the second power terminal; a plurality of high-side switches, each high-side switch having a high-side terminal and a low-side terminal, the high-side terminals of the plurality of high-side switches being respectively electrically connected to the first drive terminal; and a plurality of low-side switches, each low-side switches having a high-side terminal and a low-side terminal, the low-side terminals of the plurality of low-side switches being respectively electrically connected to the second drive terminal, while the control method includes: making one of the plurality of high-side switches in an on state or an off state; and making one of the plurality of low-side switches in the other of the on state and off state; wherein the low-side terminal of one of the plurality of high-side switches is connected to the high-side terminal of one of the plurality of low-side switches.

Optionally, the first control signal is a first PWM signal; the second control signal is a second PWM signal.

Optionally, a duty cycle of the first PWM signal ranges from 20% to 90%.

Optionally, a duty cycle of the first PWM signal ranges from 10% to 95%.

Optionally, a duty cycle of the first PWM signal ranges from 30% to 95%.

Optionally, an interval between a falling edge of the first control signal and a rising edge of the second control signal is a first preset duration.

Optionally, a value range of the first preset duration is 5 microseconds to 10 microseconds.

Optionally, an interval between a rising edge of the first control signal and a falling edge of the second control signal is a second preset duration.

Optionally, an interval between a falling edge of the first control signal and a rising edge of the second control signal is a first preset duration, and an interval between a rising edge of the first control signal and a falling edge of the second control signal is a second preset duration.

Optionally, a ratio of the first preset duration to the second preset duration is less than or equal to 1.

Optionally, a sum of a duty cycle of the first PWM signal and a duty cycle of the second PWM signal is less than 100%.

Optionally, a duty cycle of the second PWM signal ranges from 20% to 90%.

Optionally, a duty cycle of the second PWM signal ranges from 10% to 95%.

Optionally, a duty cycle of the second PWM signal ranges from 30% to 95%.

Optionally, when the phase current is less than or equal to zero, the second control signal turns off one of the plurality of low-side switches, or the first control signal turns off one of the plurality of high-side switches.

The present disclosure is beneficial in that it can suppress the temperature rise of the drive circuit and the switches, thereby reducing power loss.

DESCRIPTION

Hereinafter, the present disclosure will be described in detail with reference to the drawings and specific examples.

A power tool of the present disclosure may be a hand-held power tool, a garden tool, a garden vehicle such as a vehicle-type lawn mower, which is not limited herein. Power tools 10 of the present disclosure may include but are not limited to the following: screwdrivers, power drills, wrenches, angle grinders, and other power tools that require speed adjustment; sanders, and other power tools that are capable to polish workpiece; reciprocating saws, circular saws, curved saws, and other power tools that are capable to cut workpiece; electric hammers, and other power tools that are capable to impact. These tools may also be garden tools, such as pruners, chain saws, and vehicle-type lawn mowers; in addition, these tools may also be used for other purposes, such as mixers. As long as these power tools 10 can adopt the essential of the technical solutions disclosed below, they fall within the protection scope of the present disclosure.

Figure 1:
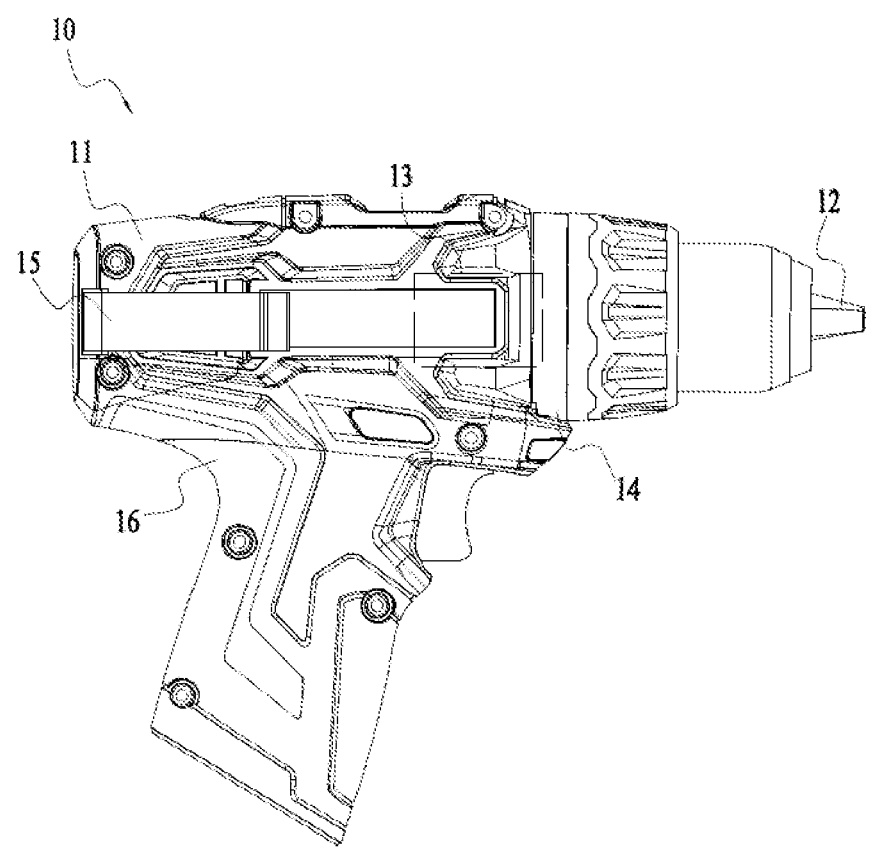
FIG. 1 is a perspective view of a power tool according to an example.

Referring to FIG. 1, a power tool 10 includes, but is not limited to: a housing 11, a functional component 12, and a motor 13.

The housing 11 constitutes the main part of the power tool 10 and houses the motor 13. One end of the housing 11 is also configured to mount the functional component 12.

The functional component 12 is configured to implement the functions of the power tool 10, such as grinding and cutting. As an example, the power tool 10 shown in FIG. 1 is a hand-held power drill, and the functional component 12 is a drill bit. The functional component 12 is operatively connected with the motor 13, for example, connected with the motor shaft 13 by a tool attachment shaft.

Figure 4:
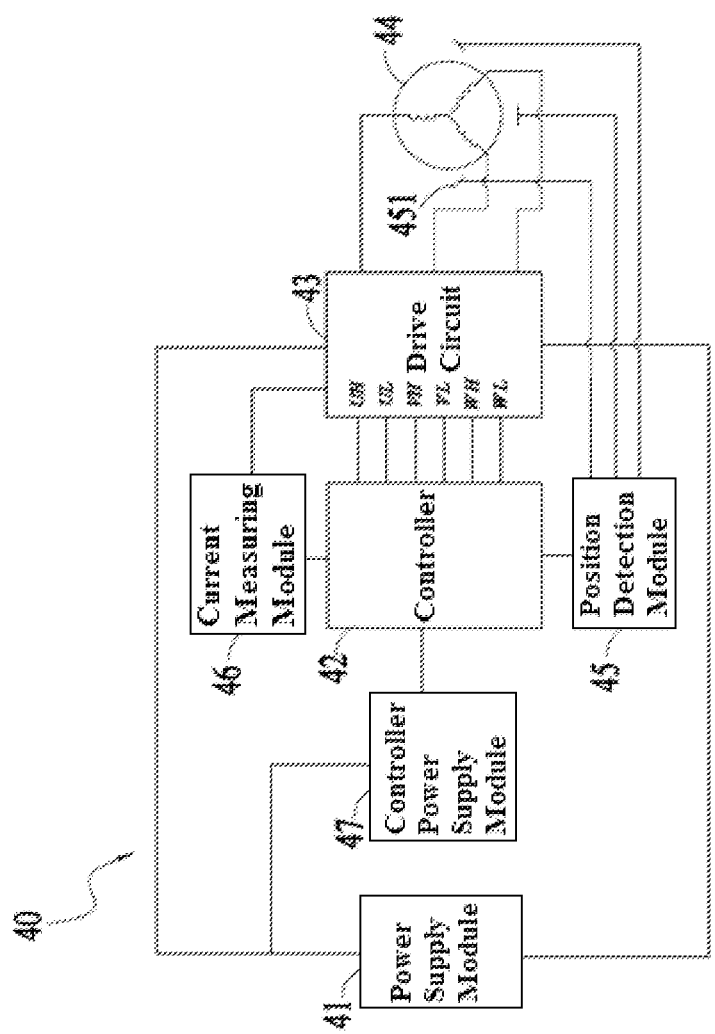
FIG. 4 is a circuit system diagram of a power tool according to an example.
Figure 5:
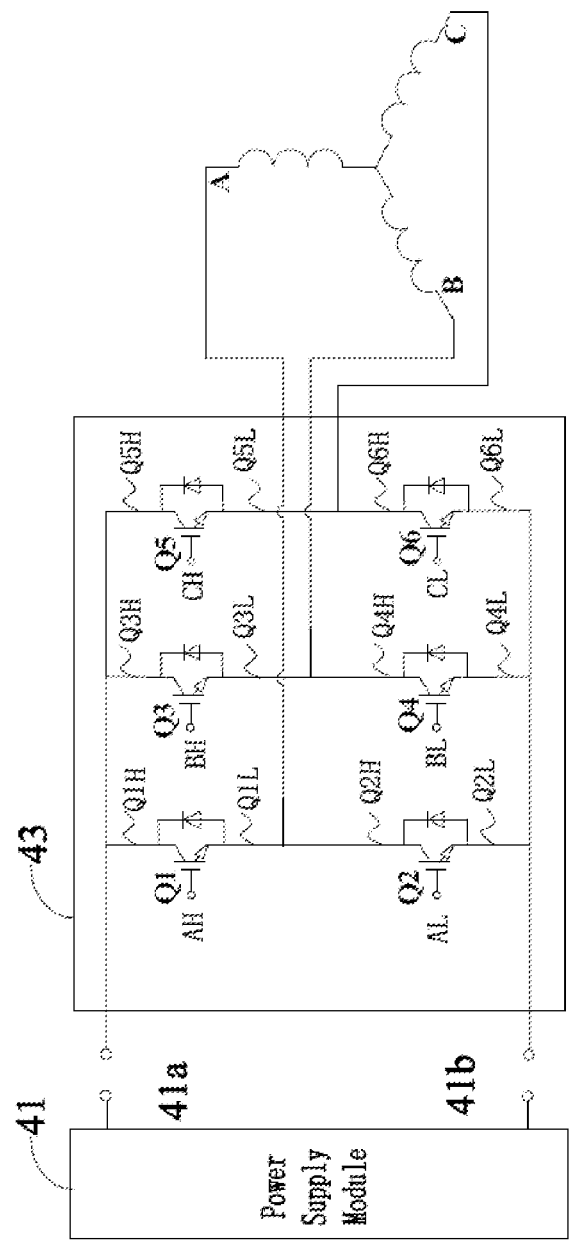
FIG. 5 is a simplified diagram of the drive circuit in FIG. 4.

The motor 13 is configured to drive the functional component 12 so as to drive the functional component 12 to work and provide power for the functional component 12. Specifically, the motor 13 includes a motor shaft, a rotor, a stator, and multi-phase windings (FIGS. 4 and 5). The motor shaft is operatively connected with the functional component 12, for example, through a transmission device 14, the motor shaft, and a tool attachment shaft supporting the functional component, the driving force of the motor shaft is transmitted to the tool attachment shaft to make the functional component 12 installed on the tool attachment shaft work.

Figure 2:
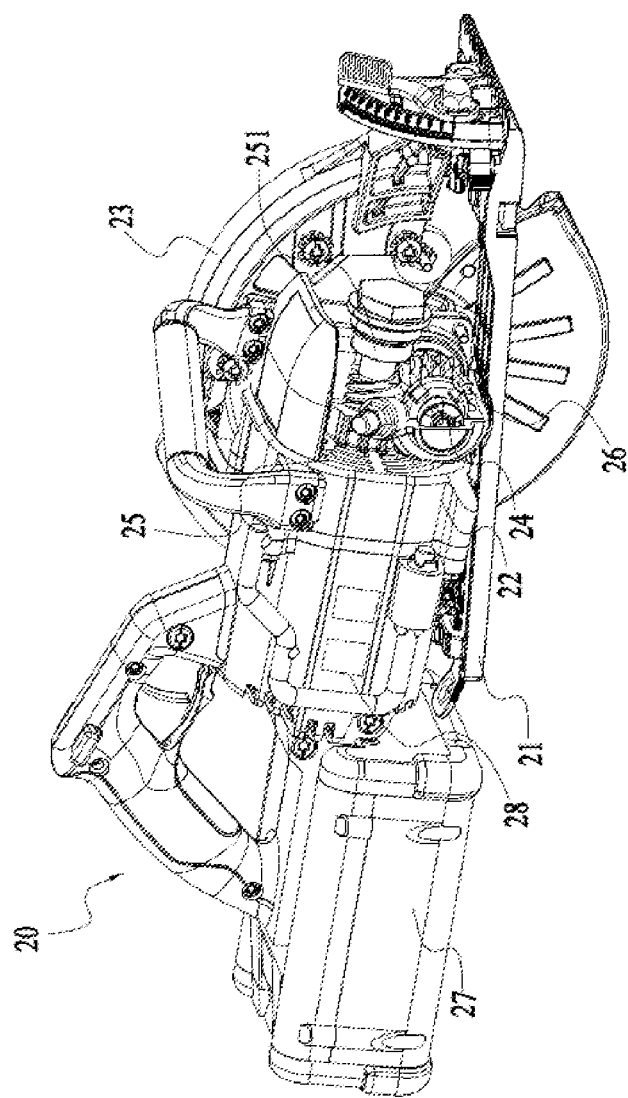
FIG. 2 is a perspective view of a power tool according to another example.

Referring to FIG. 2, as an example, a power tool 20 is a hand-held circular saw including a bottom plate 21, a housing 22, a blade guard 23, a blade shaft 24, a motor 25, a motor shaft 251, a transmission device 26, a battery pack 27, a circuit board 28 and a plurality of electronic components or electronic parts arranged on the circuit board 28.

The bottom plate 21 includes a bottom plate plane for contact with the workpiece, and the housing 22 is connected with the bottom plate 21 and fixed above the bottom plate plane. For circular saws, a saw blade is used as the functional component to realize the cutting function, and the blade shaft 24 is used as the tool attachment shaft to support the rotation of the saw blade inside the blade guard 23 to realize the cutting operation to the workpiece. The blade guard 23 is connected to the housing 22.

The motor 25 is arranged inside the housing 22. The motor 25 includes a stator, a rotor and multi-phase windings. The motor shaft 231 is connected to the rotor and driven by the rotor. The motor 25 can be operatively connected with the saw blade through the transmission device 26. Specifically, the motor 25 is connected with the motor shaft 251 and the blade shaft 24 through the transmission device 26 and transmits the rotational movement of the motor shaft 251 to the blade shaft 24, thereby driving the saw blade to rotate. Among them, the battery pack 27 is used as a power supply module to provide electrical energy for the power tool 20.

Figure 3:
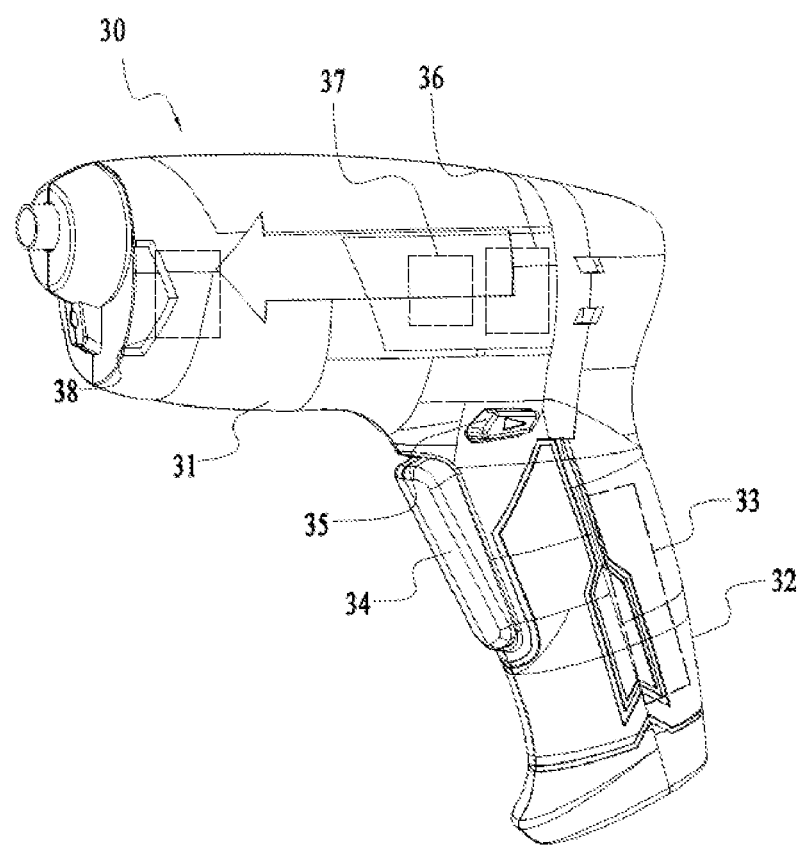
FIG. 3 is a perspective view of a power tool according to another example.

Referring to FIG. 3, an impact screwdriver 30 has a similar shape to a pistol, and mainly includes: a housing 31, the housing 31 having a substantially cylindrical part a handle 32 arranged at a certain angle to the cylindrical part, and a battery 33 arranged inside the handle. The battery 33 is used as a power supply module to provide electrical energy for the impact screwdriver 30. The handle 32 is provided with an operation switch 34 for controlling the start of the tool, and the connecting part of the handle 32 and the cylindrical part is also provided with a reverse button 35, which is provided respectively on both sides of the housing 31 for controlling the forward and reverse rotation of the tool. There is also a circuit board inside the handle, and the circuit board integrates electronic components or electronic parts such as a drive circuit and a controller. Taking the distal end of the housing 31 away from the handle 32 as a front end, and the opposite end as a rear end, a motor 36, a transmission device 37 driven by the motor, and an impact part 38 are arranged sequentially from the front to the back.

The motor 17 has a motor shaft that provides rotational output, and the top of the motor shaft is provided with a motor gear for transmitting the rotational output power of the motor 17 to the transmission device 37 through a gear structure. The transmission device 37 is configured to decelerate and then output the rotational output of the motor shaft. The tool attachment shaft is configured to support the tool attachment and is connected to the motor shaft through a transmission device 37.

The operation of the above power tools (10, 20, and 30) also depends on circuit systems. Referring to FIG. 4, as an example of a power tool circuit system 40, taking the power tool 10 as an example, the power tool 10 further includes: a power supply module 41, a controller 42, and a drive circuit 43. FIG. 4 is only an exemplary illustration and does not limit the content of the present disclosure.

The power supply module 41 is used to provide power to the power tool 10. The power supply module 41 includes a first power terminal 41a and a second power terminal 41b (FIG. 5). Optionally, the first power terminal 41a is specifically the positive power terminal of the power supply module 41, and the second power terminal 41b is specifically the negative power terminal of the power supply module 41. The power supply module 41 enables a potential difference to be generated between the first power terminal 41a and the second power terminal 41b. The power supply module 41 may be electrically connected with an external power source to provide electrical energy for the power tool 10. The external power source may be an AC power source or a DC power source, for example, a battery pack. In some examples, for an AC power source, the power supply module 41 may rectify, filter, divide, and step down the AC signal output by the AC power source through a hardware circuit; for a DC power source, the power supply module 41 may include DC-DC conversion circuit, etc.

In some examples, the power tool 10 further includes a controller power supply module 47, which is electrically connected to the power supply module 41 and the controller 42. The controller power supply module 47 is configured to convert the electrical energy supplied from the power supply module 41 to the electrical energy consumed by the controller 42.

The controller 41 is electrically connected to the drive circuit 43 for outputting drive signals to control the operation of the drive circuit 43. In some examples, the controller 41 uses a dedicated control chip (for example, MCU, microcontroller 42, Microcontroller Unit). The control chip includes a power drive unit and the power drive unit is used to enhance the drive capability of the output signals of the controller 41. The power drive unit can also be implemented by an external power drive unit.

The drive circuit 43 is connected with the motor. The motors (13, 25) may be brushless motors 44 or brushed motors. The brushless motor 44 is taken as an example to illustrate the solution of the present disclosure.

The brushless motor 44 includes multi-phase windings. Alternatively, the brushless motor 44 includes a first phase winding A, a second phase winding B, a third phase winding C, and a drive circuit 43 for driving the motor 44 to work. The drive circuit 43 includes: a first drive terminal 43a, the first drive terminal 43a being configured to electrically connect with the first power terminal 41a of the power supply module 41; and a second drive terminal 43b, the second drive terminal 43b being configured to electrically connect with the second power terminal 41b of the power supply module 41. The drive circuit 43 further includes a plurality of high-side switches, the high-side terminals of the high-side switches being respectively electrically connected to the first drive terminal; and a plurality of low-side switches, the low-side terminals of the low-side switches being respectively electrically connected to the second drive terminal.

Optionally, the plurality of high-side switches are switches Q1, Q3, and Q5 in FIG. 5. Each high-side switch has a high-side terminal and a low-side terminal: the high-side switch Q1 has a high-side terminal Q1H and a low-side terminal Q1L; the high-side switch Q3 has a high-side terminal Q3H and a low-side terminal Q3L; the high-side switch Q5 has a high-side terminal Q5H and a low-side terminal Q5L. The high-side terminal Q1H of the high-side switch Q1, the high-side terminal Q3H of the high-side switch Q3, and the high-side terminal Q5H of the high-side switch Q5 are respectively connected to the first power terminal 41a of the drive circuit 43.

Optionally, the plurality of low-side switches are switches Q2, Q4, and Q6 in FIG. 5. Each low-side switch also has a high-side terminal and a low-side terminal: the low-side switch Q2 has a high-side terminal Q2H and a low-side terminal Q2L; the low-side switch Q4 has a high-side terminal Q4H and a low-side terminal Q4L; the low-side switch Q6 has a high-side terminal Q6H and a low-side terminal Q6L. The low-side terminal Q2L of the low-side switch Q2, the low-side terminal Q4L of the low-side switch Q4, the low-side terminal Q6L of the low-side switch Q6 are respectively connected to the second power terminal 41b of the driver circuit 43.

The low-side terminal Q1L of the above-mentioned high-side switch Q1 is connected to the high-side terminal Q2H of the low-side switch Q3, the low-side terminal Q3L of the high-side switch Q3 is connected to the high-side terminal Q4H of the low-side switch Q4, and the low-side terminal Q5L of the high-side switch Q5 is connected to the high-side terminal Q6H of the low-side switch Q6.

In an example, the low-side terminal Q1L of the high-side switch Q1 and the high-side terminal Q2H of the low-side switch Q2 are both connected to the first phase winding A; the low-side terminal Q3L of the high-side switch Q3 and the high-side terminal Q4H of the low-side switch Q4 are both connected to the second phase winding B; the low-side terminal Q5L of the high-side switch Q5 and the high-side terminal Q6H of the low-side switch Q6 are both connected to the third phase winding C. The three-phase windings A, B, and C of the brushless motor 44 are connected to the power supply module 41 through a bridge composed of the plurality of high-side switches Q1, Q3, Q5 and the plurality of low-side switches Q2, Q4, Q5 mentioned above. The above-mentioned high-side switches and low-side switches may be semiconductor devices, such as, for example, a metal-oxide semiconductor field effect transistor (MOSFET) or an insulated gate bipolar transistor (IGBT). Each high-side switch and low-side switch is connected in parallel with a parasitic diode. AH, AL, BH, BL, CH, and CL are the control terminals of high-side switch Q1, low-side switch Q2, high-side switch Q3, low-side switch Q4, high-side switch Q5, and low-side switch Q6, respectively.

In the following example of using the MOSFET as a switch, the structure of the drive circuit 43 will be described in detail. The control terminals AH, AL, BH, BL, CH, CL of the switches Q1-Q6 are electrically connected to the controller 42 respectively. For the MOSFET, the control terminal of each switch is the gate, and each drain or source of the switches Q1-Q6 is connected to each phase winding of the brushless motor 44. Alternatively, the drains of the high-side switches Q1, Q3, and Q5 are all connected to the first power terminal 41a of the power supply module 41 through the first drive terminal 43a, and the sources of the high-side switches Q1, Q3, Q5 are respectively connected to the first phase winding A, the second phase winding B, and the third phase winding C; the drains of the low-side switches Q2, Q4, Q6 are respectively connected to the first phase winding A, the second phase winding B, and the third phase winding C, and the sources of the low-side switches Q2, Q4, and Q6 are all connected to the second power terminal 41b of the power supply module 41 through the second drive terminal 43b. The switches Q1-Q6 change their conduction state according to the control signals output by the controller 42 in order to change the voltage state of the power supply module 41 applied to the windings of the brushless motor 11. In this example, the high-side switches Q1, Q3, and Q5 are respectively used to turn on or off the electrical connection between the first phase winding A, the second phase winding B, the third phase winding C and the first power terminal 41a of the power supply module 41. The low-side switches Q2, Q4, and Q6 are respectively used to turn on or off the electrical connection between the first phase winding A, the second phase winding B, the third phase winding C and the second power terminal 41b of the power supply module 41.

Optionally, the power tool 10 further includes a position detection module 45, which is connected with the brushless motor 44 and the controller 42 for detecting the position of the rotor in the brushless motor 44. Specifically, when the rotor rotates into a predetermined range, the position detection module 45 is in one signal state, and when the rotor rotates out of the predetermined range, the position detection module 45 switches to another signal state. In some examples, the position detection module 45 includes a position sensor 451 (for example, a Hall sensor). In other examples, the position detection module 45 does not include a position sensor 451 but determines the position of the rotor and perform commutation based on back electromotive force signals.

In this example, the position detection module includes a position sensor 451, and the position sensor 451 is three Hall sensors. As shown in FIG. 4, three Hall sensors are arranged along the circumferential direction of the rotor of the brushless motor 44, and the position information of the rotor detected by the Hall sensors is input to the position detection module 45. The position detection module 45 converts the input position of the rotor into the position information of the rotor that can be communicated with the controller 42 through logic processing and then input the position information to the controller 42. When the rotor rotates into and out of the predetermined range, the signal of the Hall sensors varies, and the output signal of the position detection module 45 varies accordingly.

When the rotor rotates into the predetermined range, the output signal of the position detection module 45 is defined as 1, and when the rotor rotates out of the predetermined range, the output signal of the position detection module 45 is defined as 0. The three Hall sensors are arranged at a physical angle of 120° from each other.

When the rotor rotates, the three Hall sensors will generate position signals including six signal combinations so that the position detection module 45 outputs a position signal from one of the six signal combinations. If arranged in the order in which the Hall sensors are placed, there will be six different signal combinations 100, 110, 010, 011, 001, and 101. In this way, the position detection module 45 can output one of the six position signals mentioned above, and thus the position of the rotor can be determined according to the position detection signal output by the position detection module 45.

The brushless motor 44 with three-phase windings has six drive states in a power-on period, which corresponds to the output signal generated by the above solution. Therefore, the brushless motor 44 performs commutation when the output signal from the position detection module 45 changes.

In order to make the brushless motor 44 rotate, the drive circuit 43 has multiple drive states. In each drive state, the stator windings of the brushless motor 44 generate a magnetic field. The controller 42 controls the drive circuit 43 to switch the drive state to rotate the magnetic field generated by the winding, so as to drive the rotor to rotate, and thereby driving the brushless motor 44.

In order to drive the brushless motor 44, the drive circuit 43 has at least six drive states. For the convenience of description, hereafter, the drive state is represented by the connection terminals corresponding to the drive state. For example, if the controller 42 controls the drive circuit 43 to connect the first phase winding A to the first power terminal 41a of the power supply module 41 and connect the second phase winding B to the second power terminal 41b of the power supply module 41, the drive state is represented as AB, and in this state, the first phase winding A and the second phase winding B are energized, which is referred to as AB phase conduction. If the controller 42 controls the drive circuit 43 to connect the first phase winding A to the second power terminal 41b of the power module 41 and connect the second phase winding B to the first power terminal 41b of the power module 41, the drive state is represented as BA, and in this state, the first phase winding A and the second phase winding B are energized, which is referred to as BA phase conduction, its current direction being opposite to that of AB. The drive mode expressed in this way is also applicable to the delta connection scheme of windings. In addition, the switching of the drive state may also be simply referred to as the commutation operation of the brushless motor 44. Obviously, the brushless motor 44 commutates once per 60° electrical angle rotation by the rotor. The interval from one commutation to the next commutation of the brushless motor 44 is defined as the commutation interval.

Figure 6A:
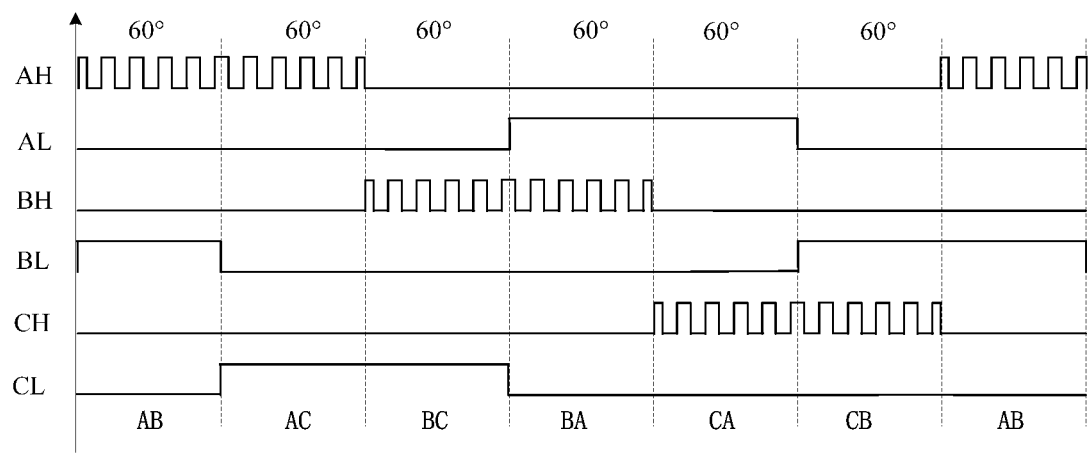
FIG. 6A is a waveform diagram of a control signal of a conventional drive circuit.
Figure 7A:
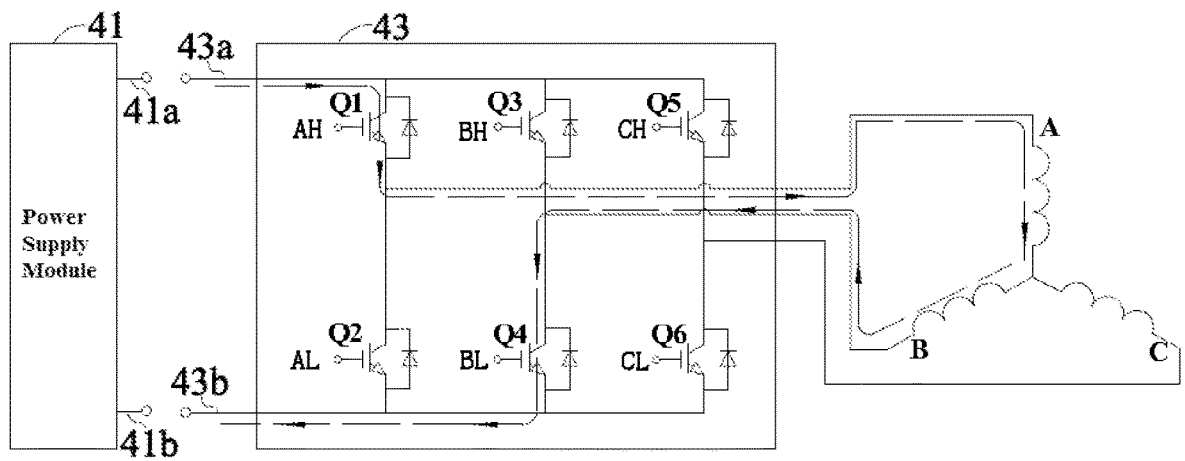
FIG. 7A is a diagram showing a current trend when a motor drive state is in the AB state.

FIG. 6A is a waveform diagram of a first conventional control signal of the drive circuit 43. The high-side switches (Q1, Q3, Q5) in a current circuitry use pulse width modulation (PWM) signal to control the motor speed. Specifically, during the PWM signal control period of one of the high-side switches, one of the low-side switches maintains a conducting state, and the high-side switch, the low-side switch and the corresponding windings form a current circuitry, in which the power supply current from the power supply module 41 passes through the first drive terminal 43a, the high-side switch, the windings, and the low-side switch. For example, when the controller 42 controls the brushless motor 44 to make the motor drive state to be the AB state, the high-side switch Q1 is controlled by the PWM signal. During the PWM control period of the high-side switch Q1, the controller 42 outputs a low-level signal to the low-side switch Q4 so as to keep it in the conducting state; the high-side switch Q1, the low-side switch Q4, the corresponding first phase winding A and second phase winding B form a current circuitry, in which the power supply module 41 of the power supply current from the power supply module 41 passes through the first drive terminal 43a, the high-side switch Q1, the first phase winding A, the second phase winding B, the low-side switch Q4, and the second drive terminal 43b, as shown in FIG. 7A.

Figure 6B:
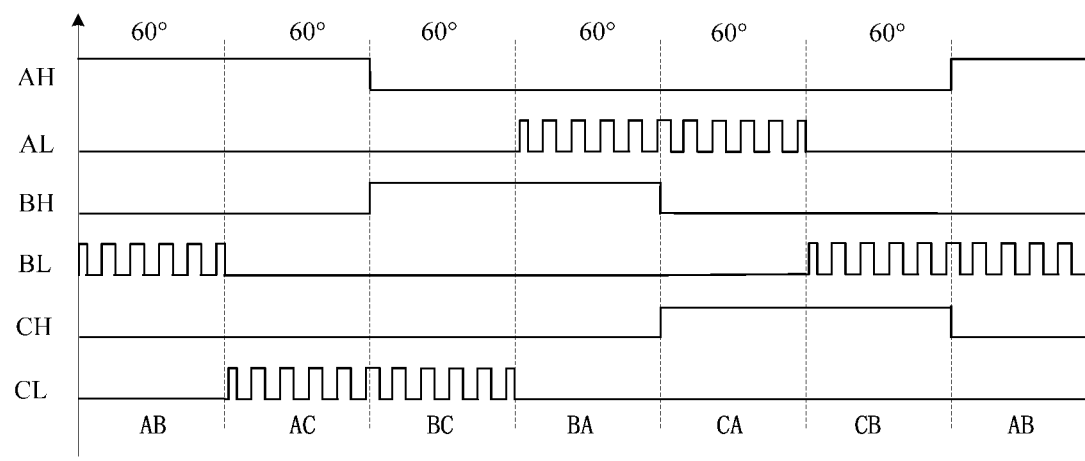
FIG. 6B is a waveform diagram of a control signal of another conventional drive circuit.

FIG. 6B is a waveform diagram of a second conventional control signal. The low-side switches (Q2, Q4, Q6) in a current circuitry use pulse width modulation (PWM) signal to control the motor speed. Specifically, during the PWM signal control period of one of the low-side switches, one of the high-side switches maintains a conducting state, and the high-side switch, the low-side switch and the corresponding windings form a current circuitry, in which the power supply current from the power supply module 41 passes through the first drive terminal 43a, the high-side switch, the windings, the low-side switch, and the second drive terminal. For example, when the controller 42 controls the brushless motor 44 to make the motor drive state to be the AB state, the low-side switch Q4 is controlled by the PWM signal. During the PWM signal control period of the low-side switch Q4, the controller 42 outputs a high-level signal to the high-side switch Q1 so as to keep it in the conducting state, the high-side switch Q1, the low-side switch Q4, the corresponding first phase winding A and second phase winding B form a current circuitry, in which the power supply module 41 of the power supply current from the power supply module 41 passes through the first drive terminal 43a, the high-side switch Q1, the first phase winding A, the second phase winding B, the low-side switch Q4, and the second drive terminal 43b.

Figure 7B:
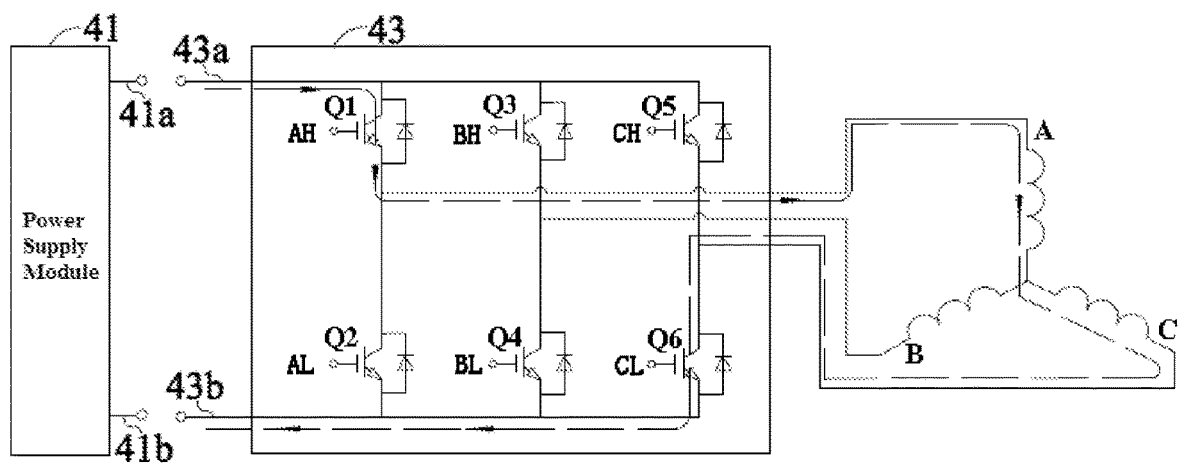
FIG. 7B is a diagram showing the current trend when the motor drive state in the AC state.

During the operation of the brushless motor 44, when the rotor rotates through an electrical angle of 60°, the brushless motor 44 commutes once, that is, every time the rotor rotates through an electrical angle of 60°, the motor drive state is switched from the previous state to the next state. With reference to FIGS. 6A, 7A and 7B, the process in which the controller 42 controls the motor drive state of the brushless motor 44 to switch from the AB state to the AC state is described as an example, wherein the high-side switch PWM signal control method is adopted: the controller 42 outputs a PWM signal to the control terminal AH of the high-side switch Q1 to turn on or off the high-side switch Q1, and the controller 42 synchronously outputs a high-level signal to the control terminal BL of the low-side switch Q4 to keep the low-side switch Q4 in the conducting state, the first phase winding A and the second phase winding B are energized, and the motor drive state is in the AB state (as shown in FIG. 7A); the controller 42 outputs a PWM signal to the control terminal AH of the high-side switch Q1 to turn on or off the high-side switch Q1, and the controller 42 synchronously outputs a low-level signal to the control terminal BL of the low-side switch Q4 to keep the low-side switch Q4 off, and the controller 42 synchronously outputs a high-level signal to the control terminal CL of the low-side switch Q6 to keep the low-side switch Q6 in the conducting state, the motor drive state is switched from the AB state to the AC state, the first phase winding A and the third phase winding C are energized, and the second phase winding B is de-energized (as shown in FIG. 7B).

Figure 8:
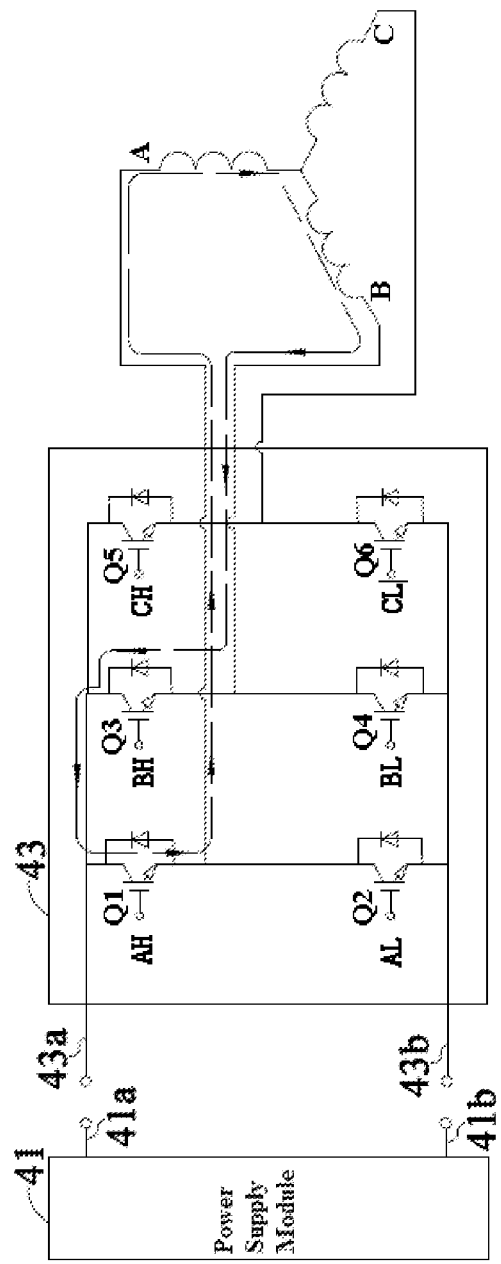
FIG. 8 is a diagram showing the current trend that is not transient when the motor drive state is switched from the AB state to the AC state.

However, because each switch has a parasitic diode connected in parallel, during the PWM signal control period of one of the high-side switches, when it switches from the on state to the off state, due to the existence of inductive elements in the circuitry (for example, the windings of the motor), the current is not transient, and the motor current will pass through the parasitic diode of the low-side switch connected to the low-side terminal of the high-side switch. As shown in FIG. 7A, when the motor drive state is in the AB state, the high-side switch Q1 is turned on and the low-side switch Q4 is turned on, when the motor drive state is switched from the AB state as shown in FIG. 7A to the AC state as shown in FIG. 7B, due to the existence of inductive elements, as shown in FIG. 8, the current is not transient. For example, when the high-side switch is controlled with the PWM, the non-transient current will pass through the parasitic diode in parallel with the high-side switch Q3. The parasitic diode of the high-side switch Q3 generates heat from internal resistance, and the temperature of the high-side switch Q3 and the drive circuit 43 connected in parallel with the parasitic diode rises. Specifically, under heavy load and high current, the heating loss is more severe. Therefore, this traditional control method will bring relatively severe power loss.

Figure 9:
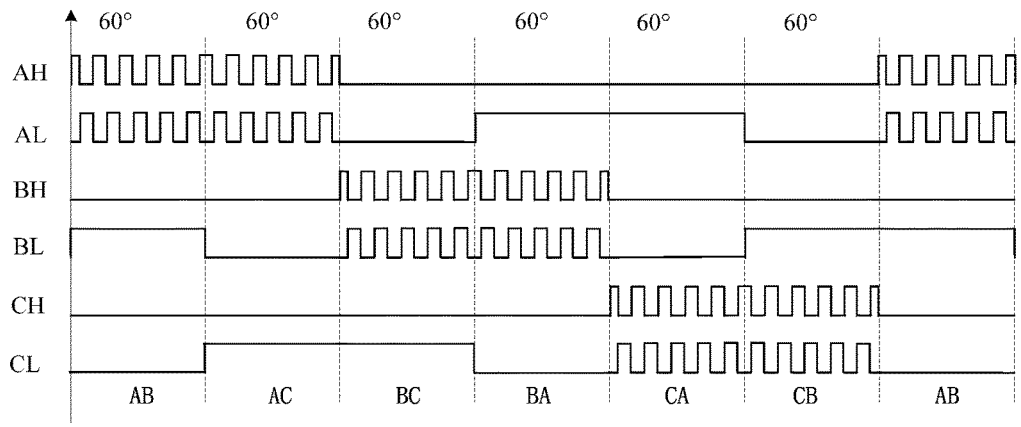
FIG. 9 is a waveform diagram of a control signal applied to a control terminal of each switch by a controller according to the present disclosure.

In order to overcome the above technical problem, the heat generation problem caused by the current passing through the parasitic diode, referring to FIG. 9, the controller 42 of the power tool 10 of the present disclosure is configured to: output a first control signal to one of the high-side switches (Q1, Q3, Q5) to make one of the high-side switches (Q1, Q3, Q5) in an on state or an off state; output a second control signal to one of the low-side switches (Q2, Q4, Q6) to make one of the low-side switches (Q2, Q4, Q6) in the other of the on state and the off state; wherein, the low-side terminal of one of the high-side switches (Q1, Q3, Q5) is connected to the high-side terminal of one of the low-side switches (Q2, Q4, Q6) to reduce heat generation and power loss. In other words, in this example, when the first control signal causes one of the high-side switches to be in the off state, the second control signal causes the low-side switch directly connected to the low-side terminal of the high-side switch to be in the on state; and/or, when the second control signal causes one of the low-side switches to be in the off state, the first control signal causes the high-side switch directly connected to the high-side terminal of the low-side switch to be in the on state. In other words, in this example, the high-side switch and the low-side switch in which the low-side terminal of the high-side switch and the high-side terminal of the low-side switch are directly connected have opposite on-off states. The advantage of this solution is to make the non-transient current pass through the high-side switch directly connected to the high-side terminal of the low-side switch or pass through the low-side switch directly connected to the low-side terminal of the high-side switch instead of passing through the parasitic diode to reduce heat generation and power loss.

Further, the first control signal output by the controller 42 is a first PWM signal and the second control signal output by the controller 42 is a second PWM signal.

Alternatively, the controller synchronously outputs the first control signal and the second control signal.

According to a specific example, the high-side switch adopts a PWM signal control method, and the controller 42 is configured to: output a first control signal to make one of the high-side switches in an on state or an off state, and the first control signal is the first PWM signal; output a high-level signal to keep one of the low-side switches in the on state during the PWM signal control period of the high-side switch to form a current circuitry; synchronously output a second control signal to make the low-side switch connected to the low-side terminal of the high-side switch in the other of the on state and the off state, and the second control signal is the second PWM signal. Taking the motor drive state in the AB state as an example, the controller 42 outputs a first control signal to make the high-side switch Q1 in an on state or an off state, the first control signal is the first PWM signal, and the controller 42 outputs a high-level signal to keep the low-side switch Q4 in the on state during the PWM signal control period of the high-side switch Q1 to form a current circuitry; the controller 42 synchronously outputs the second control signal to make the low-side switch Q2 connected to the low-side terminal of the high-side switch Q1 in the other of the on state and the off state, and the second control signal is the second PWM signal.

According to another specific example, the low-side switch adopts a PWM signal control method, and the controller 42 is configured to: output a second control signal to make one of the low-side switches in an on state or an off state, and the second control signal is the second PWM signal; output a high-level signal to keep one of the high-side switches in the on state during the PWM signal control period of the low-side switch to form a current circuitry; synchronously output a first control signal to make the high-side switch connected to the high-side terminal of the low-side switch in the other of the on state and the off state, and the first control signal is the first PWM signal. Taking the motor drive state in the AB state as an example, the controller 42 outputs a second control signal to make the low-side switch Q4 in an on state or an off state, the second control signal is the second PWM signal, and the controller 42 outputs a high-level signal to keep the high-side switch Q1 in the on state during the PWM signal control period of the low-side switch Q4 to form a current circuitry; the controller 42 synchronously outputs the first control signal to make the high-side switch Q3 connected to the high-side terminal of the low-side switch Q4 in the other of the on state and the off state, and the first control signal is the first PWM signal.

The foregoing description is only illustrative and does not limit the content of the present disclosure. It should be understood that other phases similarly follows to the foregoing example, and will not be repeated herein.

Figure 10:
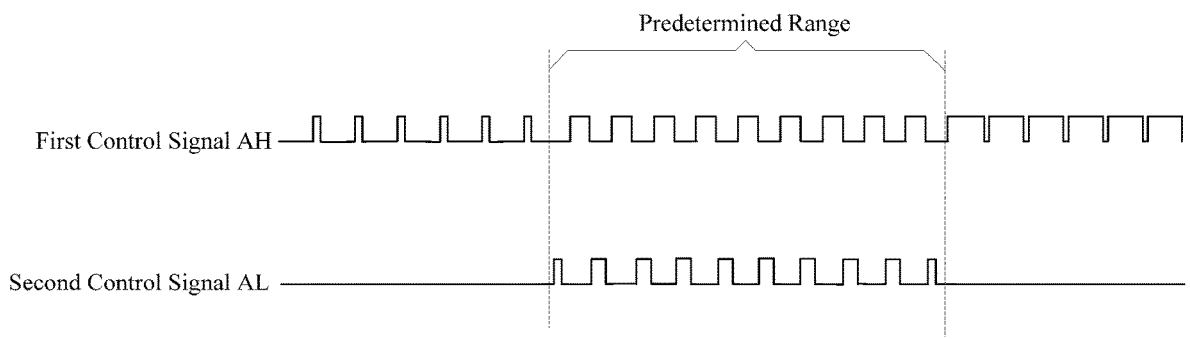
FIG. 10 is a waveform diagram of a first control signal and a second control signal according to an example.

Referring to FIG. 10, as an alternative, only when the duty cycle of the first PWM signal meets certain preset conditions does the controller 42 output the second PWM signal synchronously. Specifically, only when the duty cycle of the first PWM signal falls within the predetermined range does the controller 42 output the second PWM signal.

Optionally, at least when the duty cycle of the first PWM signal is in the range of 20% to 90% (including 20% and 90%) does the controller 42 output the second PWM signal.

Optionally, at least when the duty cycle of the first PWM signal is in the range of 10% to 95% (including 10% and 95%) does the controller 42 output the second PWM signal to control the low-side switch of the phase bridge circuit.

Optionally, at least when the duty cycle of the first PWM signal is in the range of 30% to 95% (including 30% and 95%) does the controller 42 output the second PWM signal to control the low-side switch of the phase bridge circuit.

In this way, only when the duty cycle of the first PWM signal meets the preset conditions does the controller 42 output the second PWM signal. The advantages are as follows: on the one hand, when the first PWM signal output by the controller 42 makes one of the high-side switches to be in the off state, the second PWM signal output by the controller 42 makes the low-side switch connected to the low-side terminal of the high-side switch to be in the on state. If the duty cycle of the first PWM signal is small, the current of the corresponding winding drops fast such that the current is prone to be less than zero. A current less than zero will produce a negative torque and cause a brake effect to reduce the motor speed, which is disadvantageous, and if the low-side switch connected to the low-side terminal of the high-side switch is turned on when the high-side switch is turned off, this disadvantage will be aggravated. Plus, when the duty cycle of the first PWM signal is small, the current flowing through the high-side switch is small, so the heat generated is small, and at this time, the controller 42 does not need to output the second PWM signal to control the low-side switch connected to the low-side terminal of the high-side switch to reduce heat generation and power loss. On the other hand, when the first PWM signal output by the controller 42 makes one of the high-side switches to be in the off state, the second PWM signal output by the controller 42 makes the low-side switch connected to the low-side terminal of the high-side switch to be in the on state. If the duty cycle of the first PWM signal is large, the above scheme will make the duty cycle in which the second PWM signal could be inserted to be very small, yielding little effect, and on the contrary, causing switching loss due to frequent switching of the switches.

Figure 11:
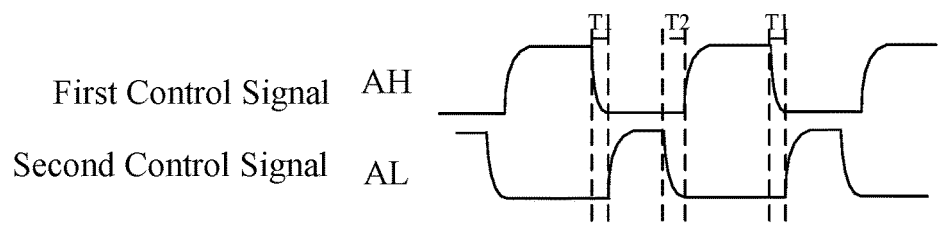
FIG. 11 is a waveform diagram of the first control signal and a waveform diagram of the second control signal according to another example.

Referring to FIG. 11, in an example, there is a first preset duration T1 between the falling edge of the first control signal and the rising edge of the second control signal, and there is a second preset duration T2 between the rising edge of the first control signal and the falling edge of the second control signal. In other words, the first preset duration T1 is the time interval between the falling edge of the first control signal and the rising edge of the second control signal, and the second preset duration T2 is the time interval between the rising edge of the first control signal and the falling edge of the second control signal.

Figure 12A:
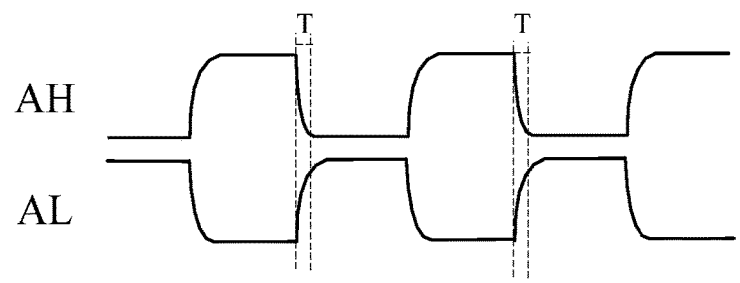
FIG. 12A is an actual waveform diagram of the conventional control signal applied to the control terminal AH of the high-side switch Q1 and an actual waveform diagram of the control signal applied to the control terminal AL of the low-side switch Q2.
Figure 12B:
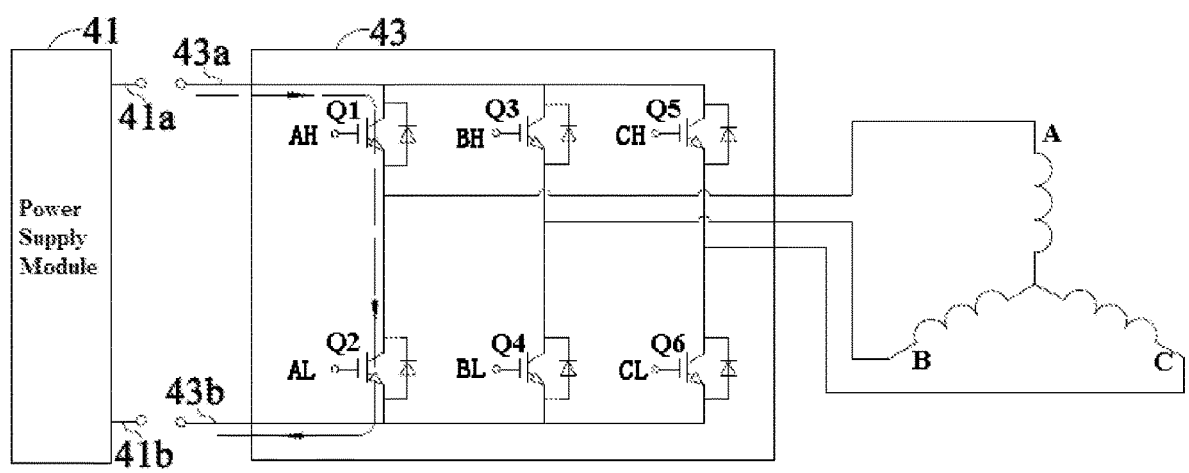
FIG. 12B is a diagram showing the current trend of a short circuit caused by the conventional control signal in FIG. 12*a*.

The advantages are as follows: on the one hand, it avoids the situation that when the first control signal is at the falling edge, the rising edge of the second control signal starts immediately, and the low-side switch has been turned on when the high-side switch has not been completely turned off, which may cause a short-circuit, and thereby burning the circuit and electronic components. In particular, referring to FIG. 12A, due to rise/fall times, the actual square wave signals are not perfect squares, its rising and falling edges are not transient, but rather shows a slow variation with a small delay time T. Referring to FIG. 12B, taking phase A as an example, when the first control signal output by the controller 42 turns off the high-side switch Q1, the second control signal output by the controller 42 turns on the low-side switch Q2 connected to the low-side terminal of the high-side switch Q1. If the rising edge of the second control signal starts immediately when the first control signal is at the falling edge, the high-side switch Q1 and the low-side switch Q2 may be turned on at the same time. The occurrence of short-circuit phenomenon may easily damage or even burn the electronic components. By adopting the first preset duration T1 between the falling edge of the first control signal and the rising edge of the second control signal, the occurrence of the above-mentioned short-circuit phenomenon can be effectively avoided.

Figure 13A:
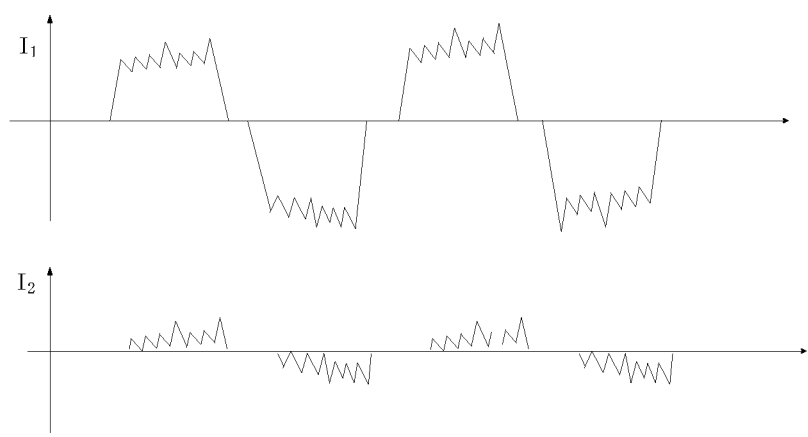
FIG. 13A is a waveform diagram of current I1 of the windings under heavy load and current I2 of the windings under light load.
Figure 13B:
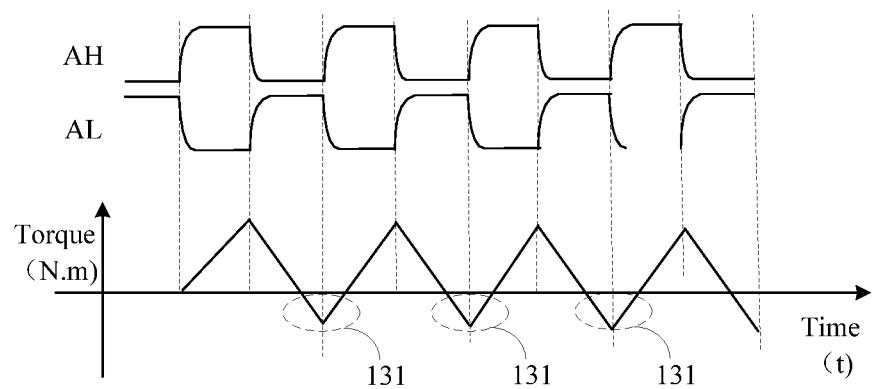
FIG. 13B is a diagram showing the relationship between the first control signal applied to the control terminal AH of the high-side switch Q1 and the second control signal applied to the control terminal AL of the low-side switch Q2 and the output torque of the motor according to an example.

On the other hand, it avoids the generation of negative torque and the brake effect. Specifically, referring to FIGS. 13A and 13B, taking phase A as an example, during the PWM control period, if the load is large and the current I1 of the first phase winding A is large, the motor will continue to output forward torque; if the load is small and the current I2 of the first phase winding A is small, the first control signal output by the controller 42 causes the high-side switch Q1 to be in the off state, and the second control signal output by the controller 42 causes the low-side switch Q2 connected to the high-side switch Q1 to be in the on state, if the low-side switch Q2 remains on for a long time, the current I1 will drop fast, maybe to a negative value; at this time, a negative torque 131 will be generated, resulting in the brake effect that decreases the motor speed.

Similarly, when the low-side switches realizes the PWM control method, as an option, the value range of the duty cycle of the second PWM signal is 20% to 90%. Optionally, the value range of the duty cycle of the second PWM signal is 10% to 95%. Optionally, the value range of the duty cycle of the second PWM signal is 30% to 95%.

Figure 13C:
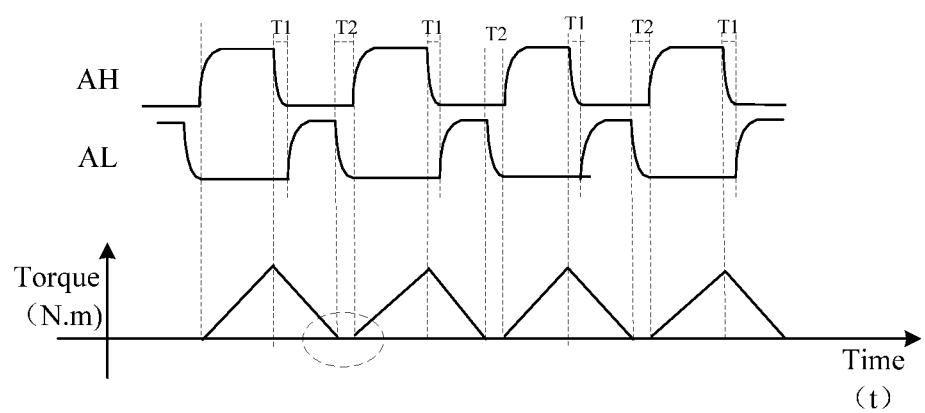
FIG. 13C is a diagram showing the relationship between the control signal applied to the control terminal AH of the high-side switch Q1 and the control terminal AL of the low-side switch Q2 and the output torque of the motor according to another example.

By adopting the second preset time period T2 between the rising edge of the first control signal and the falling edge of the second control signal, the generation of negative torque and the decrease of the motor speed can be effectively avoided. Specifically, referring to FIG. 13C, taking phase A as an example, the first control signal output by the controller 42 is applied to the control terminal AH of the high-side switch Q1, and the second control signal output by the controller 42 is applied to the control terminal AL of the low-side switch Q2 connected to the low-side terminal of the high-side switch Q1. After each falling edge of the first control signal starts, wait for the first preset duration T1 to start the rising edge of the second control signal, and after the falling edge of the second control signal starts, wait for the second preset duration T2 to start the rising edge of the first control signal. Wherein, the first control signal is the first PWM signal, and the second control signal is the second PWM signal. Due to the existence of the first preset duration T1 and the second preset duration T2, the situation that both the high-side switch Q1 and the low-side switch Q2 are turned on at the same time will not occur, thereby avoiding the occurrence of the short-circuit phenomenon, and under light load conditions, the existence of the second preset duration T2 can avoid the occurrence of negative torque, which causes the brake effect and reduces the motor speed.

Optionally, the value range of the first preset duration T1 is 0.5 microseconds to 10 microseconds (including the endpoints 0.5 microseconds and 10 microseconds). Optionally, the value range of the second preset duration is 5 microseconds to 30 microseconds.

Actual experimental results show that when the first preset duration T1 is between 0.5 microseconds and 10 microseconds (including the endpoints 0.5 microseconds and 10 microseconds), the short circuit problem could be prevented, and the suppression of temperature rise is more effective.

In an example, only utilise the first preset duration T1 between the falling edge of the first control signal and the rising edge of the second control signal, so as to avoid the high-side switch and the low-side switch connected to the low-side terminal of the high-side switch from being turned on at the same time, which causes a short circuit. In an example, only utilise the second preset duration T2 between the rising edge of the first control signal and the falling edge of the second control signal, so as to avoid the generation of negative torque that causes the brake effect. The above two examples are similar to the first example and will not be repeated herein.

Alternatively, the sum of the duty cycle of the first PWM signal and the duty cycle of the second PWM signal may be configured to be less than 100% to avoid the high-side switch and the low-side switch connected to the low-side terminal of the high-side switch from being turned on at the same time, which causes a short circuit, and/or avoid the generation of negative torque that causes the brake effect and reduces the motor speed.

For the drive circuit 43, when the high-side switch is in the on state and the low-side switch connected to the low-side terminal of the high-side switch is in the off state, the current corresponding to the conducting windings rises. Conversely, when the high-side switch is in the off state and the low-side switch connected to the low-side end of the high-side switch is in the on state, the current corresponding to the conducting windings drops.

In order to control the motor of the power tool to keep outputting positive torque to suppress the brake effect caused by negative torque generated when the motor is driven, the ratio of the first preset duration T1 and the second preset duration T2 should be less than or equal to 1. In a specific example, for example, the first preset duration T1 is set to 0.5 microseconds, and the second preset duration T2 is set to 0.8 microseconds; for another example, the first preset duration T1 is set to 1 microsecond, and the second preset duration T2 is set to 2 microsecond; for another example, the first preset duration T1 is set to 10 microseconds, and the second preset duration T2 is set to 13 microseconds. The foregoing description is only illustrative and is not a limitation of the present disclosure.

On this basis, the second preset duration T2 is dynamically adjusted so that the current of the motor winding is greater than or equal to zero. In this way, the motor does not output negative torque, which generates the brake effect to reduce the motor speed when the motor is driven.

Optionally, the power tool 10 further includes a current measuring module 46 (FIG. 4) for detecting or estimating the phase current.

In the high-side switch PWM signal control mode, the controller 42 is configured to: when the phase current is less than or equal to zero, the controller 42 outputs the second control signal to turn off one of the low-side switches, so that the motor keeps outputting positive torque, one of the low-side switches is the low-side switch connected to the low-side terminal of the high-side switch that is currently on.

In the low-side switch PWM signal control mode, the controller 42 is configured to: when the phase current is less than or equal to zero, the controller 42 outputs the first control signal to turn off one of the high-side switches, so that the motor keeps outputting positive torque, one of the high-side switches is the high-side switch connected to the high-side terminal of the low-side switch that is currently on.

During the drive process of the motor, in order to prevent the temperature of the switches (Q1-Q6) from being too high and damaging the electronic components, it is necessary to sample the temperature of one or more switches (Q1-Q6) in order to monitor the temperature. In the traditional method, an NTC temperature sensor for temperature sampling is generally arranged on the circuit board near at least one switch of the drive circuit to effectively monitor the temperature of the bridge switches and prevent damage to the electronic components due to excessive temperature. However, the additional temperature sensor will not only increase the design and component cost of the circuit board, but also increase the size of the circuit board.

Alternatively, in order to overcome the above-mentioned problems, the controller 42 of the present disclosure adopts an MCU integrated with a temperature sensor and uses this temperature sensor to replace the additional temperature sampling NTC temperature sensor to estimate the temperature of the switches of the drive circuit 43. When the detected temperature value of the drive circuit 43 exceeds a predetermined threshold, the controller 42 controls the drive circuit 43 to stop working. Using the temperature sensor integrated inside the controller 42 to measure the temperature of the drive circuit 43 can simplify the circuit board design, save parts cost, and make the circuit board more compact. In some specific examples, the sum of the single-sided area of the circuit board is less than 2500 cm^2.

In some specific examples, a single-chip microcomputer is provided with a temperature sensor integrated therein, which can be used to measure the temperature surrounding the CPU. The measured result can be used to estimate the temperature of the drive circuit 43. When the detected temperature exceeds a predetermined value, activate the temperature protection mechanism, for example, turned off the power tool, turn on the cooling fan, and shut the drive circuit 43.

The above example is based on the power tool 10 with the brushless motor 44 with three-phase windings. Those skilled in the art should understand that the above technical solution could also be applied to other power tools with a brushless motor 44, such as two-phase brushless motor.

The present disclosure also discloses a control method of a power tool. The power tool includes a drive circuit and the drive circuit includes: a first drive terminal electrically connected to the first power terminal; a second drive terminal electrically connected to the second power terminal; a plurality of high-side switches, each high-side switch having a high-side terminal and a low-side terminal, the high-side terminals of the plurality of high-side switches being respectively electrically connected to the first drive terminal; a plurality of low-side switches, each low-side switches having a high-side terminal and a low-side terminal, the low-side terminals of the plurality of low-side switches being respectively electrically connected to the second drive terminal. The control method of the power tool comprises: making one of the plurality of high-side switches in an on state or an off state; making one of the plurality of low-side switches in the other of the on state and off state; wherein the low-side terminal of one of the plurality of high-side switches is connected to the high-side terminal of one of the plurality of low-side switches, so that the non-transient current flows through the low-side switch instead of the parasitic diode connected in parallel with the low-side switch to reduce heat generation and power loss.

Optionally, the first control signal is a first PWM signal and the second control signal is a second PWM signal.

Optionally, the controller outputs the second control signal only when the first control signal meets a preset condition. The advantages are as follows: on the one hand, when the duty cycle of the first PWM signal is small, it can avoid aggravating the generation of negative torque, and unnecessary switching of the low-side switch connected to the low-side terminal of the high-side switch; on the other hand, when the duty cycle of the first PWM signal is large, it can avoid switching of the low-side switch connected to the low-side terminal of the high-side switch, such that switching loss caused by frequent switching of the switch could be avoided.

Optionally, the value range of the duty cycle of the first PWM signal is 20% to 90%.

Optionally, the value range of the duty cycle of the first PWM signal is 10% to 95%.

Optionally, the value range of the duty cycle of the first PWM signal is 30% to 95%.

Optionally, there is a first preset duration T1 between the falling edge of the first control signal and the rising edge of the second control signal. The advantage of this is that it can avoid the situation that when the high-side switch is turned on, the low-side switch connected to the low-side terminal of the high-side switch is turned on simultaneously, which may cause a short circuit.

Optionally, the first preset duration T1 has a value range of 5 microseconds to 10 microseconds, (including the endpoints), which can prevent the short-circuit problem and suppress temperature rise.

Optionally, there is a second preset duration T2 between the rising edge of the first control signal and the falling edge of the second control signal. The advantage of this is that it can avoid the generation of negative torque that causes the brake effect to reduce the motor speed.

Optionally, there is a first preset period of time T1 between the falling edge of the first control signal and the rising edge of the second control signal, and there is a second preset duration T2 between the rising edge of the first control signal and the falling edge of the second control signal. The advantage of this is that it can avoid the short-circuit problem and suppress the temperature rise and avoid the negative torque that causes the brake effect to reduce the motor speed.

Optionally, the ratio of the first preset duration T1 to the second preset duration T2 is less than or equal to 1. The advantage of this is that it can further avoid the generation of negative torque that causes the brake effect to reduce the motor speed.

Optionally, the sum of the duty cycle of the first PWM signal and the duty cycle of the second PWM signal is less than 100%. The advantage of this is that it can prevent the short circuit problem while suppressing the temperature rise and/or can avoid the generation of negative torque that causes the brake effect to reduce the motor speed.

Optionally, the control method of the power tool further includes: when the phase current is less than or equal to zero, outputting a second control signal to turn off one of the low-side switches, so that the motor keeps outputting positive torque. Said one of the low-side switches is the low-side switch connected to the low-side terminal of the high-side switch that is currently on.

The above-mentioned examples are based on the example that the high-side switches adopt the PWM control method. For the low-side switches adopting the PWM control method, the control method is similar to the above-mentioned examples, and will not be repeated herein.

It should be noted that, for the low-side switch adopting the PWM control method, optionally, the value range of the duty cycle of the second PWM signal is 20% to 90%. Optionally, the value range of the duty cycle of the second PWM signal is 10% to 95%. Optionally, the value range of the duty cycle of the second PWM signal is 30% to 95%.

The basic principles, main features and advantages of the present disclosure have been shown and described above. Those skilled in the art should understand that the above-mentioned examples do not limit the present disclosure in any form, and all technical solutions obtained by equivalent substitutions or equivalent transformations fall within the protection scope of the present disclosure.

INDUSTRIAL APPLICABILITY

The present disclosure provides a power tool and a control method, which can effectively suppress the temperature rise of the drive circuit and reduce power loss.

What is claimed is:
1. A power tool, comprising:
a functional component for realizing a function of the power tool;
a motor for driving the functional component, the motor having a plurality of windings;

a power supply module configured to provide a power supply current, the power supply module comprising a first power terminal and a second power terminal;
a drive circuit electrically connected to the motor, the drive circuit comprising:
- a first drive terminal electrically connected with the first power terminal;
- a second drive terminal electrically connected with the second power terminal;
- a plurality of high-side switches wherein high-side terminals of the plurality of high-side switches are respectively electrically connected to the first drive terminal;
- a plurality of low-side switches wherein low-side terminals of the plurality of low-side switches are respectively electrically connected to the second drive terminal;
- a current measuring module configured to detect or estimate phase current; and
- a controller configured to:
  - output a first control signal to a one of the plurality of high-side switches to place the one of the plurality of high-side switches in an on state or an off state; and
  - output a second control signal to a one of the plurality of low-side switches to place the one of the plurality of low-side switches in the other of the on state and the off state;
- wherein the low-side terminal of the one of the plurality of high-side switches is connected to the high-side terminal of the one of the plurality of low-side switches and the controller is configured to output the second control signal to turn off the one of the plurality of low-side switches or output the first control signal to turn off the one of the plurality of high-side switches when the phase current is less than or equal to zero.

2. The power tool of claim 1, wherein the first control signal output by the controller is a first PWM signal and the second control signal output by the controller is a second PWM signal.

3. The power tool of claim 2, wherein a duty cycle of the first PWM signal ranges from 10% to 95%.

4. The power tool of claim 2, wherein a sum of a duty cycle of the first PWM signal and a duty cycle of the second PWM signal is less than 100%.

5. The power tool of claim 2, wherein a duty cycle of the second PWM signal ranges from 10% to 95%.

6. The power tool of claim 1, wherein an interval between a falling edge of the first control signal and a rising edge of the second control signal is a first preset duration and the first preset duration ranges from 5 microseconds to 10 microseconds.

7. The power tool of claim 1, wherein an interval between a rising edge of the first control signal and a falling edge of the second control signal is a second preset duration.

8. The power tool of claim 7, wherein the second preset duration ranges from 5 microseconds to 30 microseconds.

9. The power tool of claim 1, wherein an interval between a falling edge of the first control signal and a rising edge of the second control signal is a first preset duration and an interval between a rising edge of the first control signal and a falling edge of the second control signal is a second preset duration.

10. The power tool of claim 9, wherein a ratio of the first preset duration to the second preset duration is less than or equal to 1.

11. The power tool of claim 1, wherein the controller outputs the first control signal and the second control signal synchronously.

12. The power tool of claim 1, wherein the controller comprises a temperature sensor arranged inside the controller, the controller estimates a temperature of the drive circuit according to a detection value of the temperature sensor, and, when the detection value of the temperature of the drive circuit exceeds a predetermined threshold, the controller controls the drive circuit to stop working.

13. A power tool, comprising:
- a functional component for realizing a function of the power tool;
- a motor for driving the functional component, the motor having a plurality of windings;
- a power supply module configured to provide a power supply current, the power supply module comprising a first power terminal and a second power terminal;
- a drive circuit electrically connected to the motor, the drive circuit comprising:
  - a first drive terminal electrically connected with the first power terminal;
  - a second drive terminal electrically connected with the second power terminal;
  - a first high-side switch wherein a high-side terminal of the first high-side switch is electrically connected to the first drive terminal;
  - a first low-side switch wherein a low-side terminal of the first low-side switch is electrically connected to the second drive terminal;
  - a current measuring module configured to detect or estimate phase current; and
  - a controller configured to:
    - output a first control signal to the first high-side switch to place the first high-side switch in an on state or an off state; and
    - output a second control signal to the first low-side switch to place the first low-side switch in the other of the on state and the off state;
  - wherein the low-side terminal of the first high-side switch is connected to the high-side terminal of the first low-side switch and the controller is configured to output the second control signal to turn off the first low-side switches or output the first control signal to turn off the first high-side switches when the phase current is less than or equal to zero.

14. The power tool of claim 13, wherein the first control signal output by the controller is a first PWM signal and the second control signal output by the controller is a second PWM signal.

15. The power tool of claim 14, wherein a duty cycle of the first PWM signal ranges from 10% to 95%.

16. The power tool of claim 13, wherein an interval between a falling edge of the first control signal and a rising edge of the second control signal is a first preset duration and an interval between a rising edge of the first control signal and a falling edge of the second control signal is a second preset duration.

17. A power tool, comprising:
- a functional component for realizing a function of the power tool;
- a motor for driving the functional component, the motor having a plurality of windings;
- a power supply module configured to provide a power supply current, the power supply module comprising a first power terminal and a second power terminal;

a drive circuit electrically connected to the motor, the drive circuit comprising:
- a first drive terminal electrically connected with the first power terminal;
- a second drive terminal electrically connected with the second power terminal;
- a plurality of high-side switches wherein high-side terminals of the plurality of high-side switches are respectively electrically connected to the first drive terminal;
- a plurality of low-side switches wherein low-side terminals of the plurality of low-side switches are respectively electrically connected to the second drive terminal; and
- a controller configured to:
   - output a first control signal to a one of the plurality of high-side switches to place the one of the plurality of high-side switches in an on state or an off state; and
   - output a second control signal to a one of the plurality of low-side switches to place the one of the plurality of low-side switches in the other of the on state and the off state,
- wherein the low-side terminal of the one of the plurality of high-side switches is connected to the high-side terminal of the one of the plurality of low-side switches.

18. The power tool of claim 17, wherein the first control signal output by the controller is a first PWM signal and the second control signal output by the controller is a second PWM signal.

19. The power tool of claim 18, wherein a duty cycle of the first PWM signal ranges from 10% to 95%.

20. The power tool of claim 17, wherein the second preset duration ranges from 5 microseconds to 30 microseconds.

* * * * *